(12) United States Patent
Okado et al.

(10) Patent No.: US 7,001,545 B2
(45) Date of Patent: Feb. 21, 2006

(54) COMPRESSION MOLDING METHOD AND MOLD CLAMPING APPARATUS

(75) Inventors: Shoji Okado, Ama-gun (JP); Yasuhiro Yabuki, Nagoya (JP)

(73) Assignee: Kabushiki Kaisha Meiki Seisakusho, Obu (JP)

( * ) Notice: Subject to any disclaimer, the term of this patent is extended or adjusted under 35 U.S.C. 154(b) by 394 days.

(21) Appl. No.: 10/457,454

(22) Filed: Jun. 10, 2003

(65) Prior Publication Data

US 2003/0230821 A1    Dec. 18, 2003

(30) Foreign Application Priority Data

Jun. 14, 2002  (JP) ............................. 2002-173820

(51) Int. Cl.
  *B29C 45/64* (2006.01)

(52) U.S. Cl. .................... 264/40.5; 264/40.1; 425/149; 425/150; 425/450.1; 425/595

(58) Field of Classification Search ............... 264/40.1, 264/40.5; 425/595, 450.1, 150, 149
See application file for complete search history.

(56) References Cited

U.S. PATENT DOCUMENTS

| 6,013,211 A | * | 1/2000 | Seki | ........................... 264/40.5 |
| 6,157,158 A | * | 12/2000 | Ishikawa | .................... 318/626 |
| 6,840,115 B1 | * | 1/2005 | Ishikawa | ..................... 73/856 |

FOREIGN PATENT DOCUMENTS

| JP | A 5-269750 | 10/1993 |
| JP | A 11-179770 | 7/1999 |

* cited by examiner

*Primary Examiner*—Michael P. Colaianni
*Assistant Examiner*—Monica A. Fontaine
(74) *Attorney, Agent, or Firm*—Oliff & Berridge, PLC

(57) ABSTRACT

Disclosed is a compression molding method comprising the steps of: calculating an average value of mold clamping forces sensed in a plurality of mold clamping mechanisms for clamping a stationary and a movable mold half; obtaining a first control signal on the basis of deviation between a preset target mold clamping force and an average value of sensed mold clamping forces; sensing positions of movable members of the mold clamping mechanisms; obtaining an average value of sensed positions; setting the average value as a successive target position; obtaining a second control signal on the basis of deviation between each of the sensed positions and the successive target position; and obtaining a clamping control signal for each of the clamping mechanisms by adding the first control signal and the second control signal. An apparatus suitable for implementing the method is also disclosed.

9 Claims, 11 Drawing Sheets

(APPROACH STEP)

(PRESSING STEP)

(PRESSURIZATION STEP)

(PRESSURE RELEASE STEP)

(MOLD RELEASE STEP)

COMPRESSION MOLDING METHOD AND MOLD CLAMPING APPARATUS

The disclosure of Japanese Patent Application No. 2002-173820 filed on Jun. 14, 2002 including the specification, drawings and abstract is incorporated herein by reference in its entirety.

BACKGROUND OF THE INVENTION

1. Field of the Invention

The present invention relates to a compression molding method and mold clamping apparatus that may be suitable for use in injection compression molding, injection press molding, and pressurized press molding of synthetic resin materials and other molding compounds.

2. Description of the Related Art

A compression molding is known as one type of molding methods for molding compounds such as plasticized synthetic resin materials. The known compression molding involves the steps of: parting by a given amount a stationary mold half and a movable mold half that cooperate to provide a mold having a mold cavity defined therebetween, while introducing the molding compound into the mold cavity; and clamping the mold in this state to effect compression molding. By way of specific example, known methods for compression molding of synthetic resin materials include injection compression molding, injection press molding, and pressurized press molding, which may be executed in injection molding of synthetic resin material. The injection compression molding may be performed such that plasticized synthetic resin material is injected to fill the mold cavity defined between the stationary and movable mold halves clamped together, and the mold halves are re-clamped together after permitting a given amount of mold parting due to an injection pressure exerted on the mold upon injecting the material into the cavity. On the other hand, the injection press molding is performed such that plasticized synthetic resin material is injected into the mold cavity, with the stationary and movable mold halves held parted by a predetermined amount, and the mold halves are then clamped. Further, the pressurized press molding may be performed such that a primary molding of synthetic resin material or the like is pressurized.

Compared to general injection molding processes, which merely involve injecting plasticized synthetic resin material into the mold cavity defined by the stationary and movable mold halves held in a clamped state, such compression molding processes are not only more effective in preventing sink marks and other molding defects in moldings, but also afford a number of additional advantages such as improved transfer and strength characteristics, and an ability to mold thin, large moldings with consistently high precision. Thus, in recent years, such compression molding processes have been studied in-an effort to implement in molding methods for products of various kinds.

When carrying out compression molding, factors, such as symmetricity of the mold cavity or bias of the gate location prone to causes the molding compounds filled within the cavity to create reaction force to a mold clamping force or a non-uniform pressure distribution within the cavity, when the stationary and movable mold haves are clamped together. As a result, the stationary and movable mold halves tilt relative to each other so that the two mold halves cannot be clamped in parallel, possibly leading to reduced dimensional accuracy and molding defects of moldings.

Accordingly, a number of proposals have been made to date to inhibit relative tilt of the stationary mold half and movable mold half during the clamping operation in compression molding. JP-A-5-269750, for example, teaches a mold clamping apparatus control method wherein a plurality of mold clamping hydraulic cylinder mechanisms are installed between the stationary mold half and movable mold half, and during the clamping operation, feedback control is executed in such a way that a stroke position of each mold clamping hydraulic cylinder mechanism reaches a target stroke position, while at the same time controlling the stroke positions of the cylinder mechanisms so as to be mutually equal. JP-A-11-179770 teaches another mold clamping apparatus control method wherein a plurality of mold clamping hydraulic cylinder mechanisms are installed between the stationary mold half and movable mold half, and during the clamping operation, feedback control is executed in such a way that detected pressure of one of the mold clamping hydraulic cylinder mechanisms reaches a target clamping pressure, while at the same time controlling stroke positions of the other mold clamping hydraulic cylinder mechanisms to be equal to that of the one of the mold clamping hydraulic cylinder mechanisms, on the basis of detected pressure of the one mold clamping hydraulic cylinder mechanism.

However, the control method according to the former (JP-A-5-269750) has some drawbacks, since mold clamping is controlled simply on the basis of the stroke position in each mold clamping hydraulic cylinder mechanism. Namely, when clamping pressure is particularly high and the distance traveled by the movable mold half, i.e., the change in stroke position of the mold clamping hydraulic cylinder mechanism is small, the effect of the stroke position on clamping pressure is considerable. This makes it difficult to precisely control the mold clamping hydraulic cylinder mechanism at around completion of clamping or during a pressure release operation, for example, resulting in the problem of difficulty in achieving consistent clamping pressure and a tendency for clamping pressure to fluctuate during the mold clamping operation.

With the control device according to the latter (JP-A-11-179770), there is an unavoidable delay between operation of the one mold clamping hydraulic cylinder mechanism and of the other mold clamping hydraulic cylinder mechanisms which follow it, resulting in a tendency for the stationary and movable mold halves to tilt relative to each other. Additionally, clamping pressure is controlled solely on the basis of detected pressure of the one mold clamping hydraulic cylinder mechanism, making it difficult to ascertain clamping pressure acting on the molding overall. If the pressure distribution within the mold cavity be deviated, clamping pressure may differ significantly from preset molding conditions.

SUMMARY OF THE INVENTION

It is therefore one object of this invention to provide a novel compression molding method and mold clamping apparatus whereby a suitable mold clamping force may be applied with high precision to a mold, and whereby a relative tilt of a stationary mold half and a movable mold half may be controlled in order to realize a consistent molding operation.

The above and/or other objects of this invention may be attained according to at least one of the following modes of the invention. Each of these modes of the invention is numbered like the appended claims and depending from the other mode or modes, where appropriate, to indicate possible combinations of elements or technical features of the invention. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

(1) A method of compression molding that is effected by using a mold including a stationary mold half and a movable mold half that cooperate to define therebetween a mold cavity, and by executing a mold clamping operation to clamp together the stationary mold half and the movable mold half that are parted by a predetermined amount with a molding compound such as plasticized synthetic resin material present in the mold cavity with a mold clamping force exerted across the stationary mold half and the movable mold half by means of a plurality of mold clamping mechanisms, the method comprising the steps of: sensing the mold clamping forces in the plurality of mold clamping mechanisms to obtain sensed mold clamping forces; calculating an average value of the sensed mold clamping forces; obtaining a first control signal on the basis of deviation between a preset target mold clamping force for the mold clamping mechanisms and the average value of the sensed mold clamping forces; sensing positions of movable members of the plurality of mold clamping mechanisms to obtain sensed-positions of the movable members; calculating an average value of the sensed positions of the movable members of the plurality of mold clamping mechanisms; setting the average value of the sensed positions of the movable members as a successive target position; obtaining a second control signal on the basis of deviation between each of the sensed positions of the movable members of the plurality of mold clamping mechanisms and the successive target position; and obtaining a clamping control signal for each of the plurality of mold clamping mechanisms by adding the first control signal and the second control signal.

According to the compression molding method of this mode, the first control signal calculated in view of the mold clamping force is reflected in the clamping control signal applied to the mold clamping mechanisms. This makes it possible to achieve highly precisely the target mold clamping force of the mold clamping mechanisms, thus ensuring improved and stabilized molding precision. Moreover, the first control signal is not directed to a specific mold clamping mechanism only, but is instead calculated on the basis of the average value of the mold clamping force for all mold clamping mechanisms, making it possible to control mold clamping force to the target mold clamping force with a higher level of precision.

In the compression molding method of this mode, additionally, the second control signal calculated in view of the positions of the plurality of mold clamping mechanisms is also reflected in the clamping control signal applied to the mold clamping mechanisms. This makes it possible to minimize deviations among the positions of the plurality of mold clamping mechanisms, so that undesirable tilt of the stationary mold half and movable mold half relative to each other can be restricted during the mold clamping operation. Moreover, this second control signal is calculated on the basis of deviation of the positions of mold clamping mechanisms with reference to a successive target position that is an average value for all of the mold clamping mechanisms, rather than with reference to a specific mold clamping mechanism. This enables to realize: elimination of delays in position control among the plurality of mold clamping mechanisms; and control of tilt of the stationary mold half and the movable mold half relative to each other, with a higher level of precision and more consistently.

Control of the plurality of mold clamping mechanisms on the basis of the clamping control signal obtained by adding the first control signal and the second control signal need not be performed throughout the entire process during the mold clamping process in which the stationary mold half and the movable mold half are brought from a parted condition in which the two mold halves are parted from each other by the predetermined amount, to a fully clamped condition in which the two mold halves are fully clamped together. For instance, a partial implementation during the mold clamping operation, as occurs in a fourth mode described hereinbelow is possible as well. A variety of mold clamping mechanisms may be employed in the present invention, provided that both mold clamping and parallel control during compression molding can be performed by the same actuator. Depending on a kind of mold clamping mechanism, a stroke position of a hydraulic cylinder mechanism, a position of a movable plate, or alternatively an angular position of a servomotor may be employed as the position of the movable member of the mold clamping mechanism, for example.

(2) A method of compression molding according to the above-indicated mode (1), further comprising the steps of: computing a first speed signal on the basis of the deviation between the preset target mold clamping force and the average value of the sensed mold clamping forces in the plurality of the mold clamping mechanisms, in order to obtain a mold clamping force/speed conversion instruction value; and obtaining a second speed signal corresponding to the first control signal by processing the mold clamping force/speed conversion instruction value with predetermined control gain; and adding equally the second speed signal to the second control signal in order to obtain the clamping control signal for each of the mold clamping mechanisms. According to this mode, all mold clamping mechanisms are controlled equally by means of the first control signal calculated with reference to deviation between the target mold clamping force of the mold clamping mechanisms and the average value of the sensed mold clamping forces, so that tilt of the stationary mold half and the movable mold half relative to each other does not increase due to control by means of the first control signal. Therefore, even if pressure distribution within the mold should be skewed by factors such as asymmetry of the mold cavity or bias of the gate location, stable mold clamping operation will be achieved, and excellent molding precision will be consistently achieved.

(3) A method of compression molding according to the above-indicated mode (1) or (2), wherein the mold clamping mechanisms comprise mold clamping hydraulic cylinder mechanisms operated by means of servo valves, pressures in the mold clamping hydraulic cylinder mechanisms are sensed to obtain the sensed mold clamping force in the form of sensed pressure in the plurality of mold clamping hydraulic cylinder mechanisms, the first control signal is obtained on the basis of deviation between a preset target pressure for the mold clamping hydraulic cylinder mechanisms and an average value of the sensed pressures in the mold clamping hydraulic cylinder mechanisms, stroke positions of the mold clamping hydraulic cylinder mechanisms are sensed to obtain the sensed positions of the movable members in the form of sensed stroke positions in the plurality of mold clamping hydraulic cylinder mechanisms, an average value of the sensed stroke positions are calculated, the average value of the sensed stroke positions is designated as a successive target stroke position, and the second control signal is obtained on the basis of deviation between each of the sensed stroke positions of the plurality of mold clamping hydraulic cylinder mechanisms and the successive target stroke position. According to this mode, each servo valve is controlled by the clamping control signal obtained by adding the first control signal and the second control signal, whereby each mold clamping hydraulic cylinder mechanism can be controlled with a high degree of precision.

(4) A method of compression molding according to any one of the above-indicated modes (1)–(3), wherein during an initial stage of the mold clamping operation, the clamping control signal is obtained by sensing positions of the movable members of the mold clamping mechanisms; calculating an average value of the sensed positions of the movable members of the mold clamping mechanisms; obtaining a third control signal on the basis of deviation between a preset final target position and the average value of the sensed positions of the movable member of the mold clamping mechanisms; and adding the second control signal and the third control signal to obtain the clamping control signal for each of the mold clamping mechanisms, and if any of the sensed mold clamping forces in the plurality of mold clamping mechanisms reaches a target switchover mold clamping force that is preset within a range of 60–95% of the target mold clamping force, the first control signal instead of the third control signal is employed, and the first control signal and the second control signal are added to obtain the clamping control signal for each of the mold clamping mechanisms. According to this mode, in the initial stage of the mold clamping operation, control is executed on the basis of the third control signal calculated with sensed positions taken as an indicator, whereby even in the event that mold clamping force is extremely low due to areas of the mold cavity unfilled with molding compound or the like, a stable and rapid mold clamping operation can nevertheless be achieved. After mold clamping force has risen, control is executed on the basis of the first control signal calculated with the mold clamping force as an indicator, thus making it possible to control the mold clamping force with a high degree of precision and to achieve stable mold clamping operation.

(5) A compression molding method according to the above-indicated mode (4), wherein at least one of a time of the mold clamping operation and the sensed positions of the movable members of the plurality of mold clamping mechanisms are monitored in the initial stage, and the first control signal is employed instead of the third control signal on a condition that a predetermined period of time of the mold clamping operation has been elapsed or any of the movable members of the plurality of mold clamping mechanisms has reached a predetermined position prior to any of the sensed mold clamping forces in the plurality of mold clamping mechanisms reaches the target switchover mold clamping force so as to obtain the clamping control signal for each of the mold clamping mechanisms by adding the first control signal and the second control signal. According to this mode, the condition of the mold clamping operation in the initial stage is also monitored in terms of time and position. Therefore, even in the case where variation in the condition or amount of molding compound in the mold cavity makes it difficult for any of the mold clamping mechanisms to generate the target switchover mold clamping force during the initial stage of the mold clamping operation, for example, no problem is caused in transition to the control with the mold clamping force taken as an indicator. Thus, a stable mold clamping operation may be achieved.

(6) A compression molding method according to any one of the above-indicated mode (4) or (5), wherein when calculating the third control signal in the initial stage of the mold clamping operation, the final target position is set to a position on a negative side, where a completely closed state of the stationary mold half and the movable mold half is designated as zero position and a mold parting direction is designated as a positive side. According to this mode, the final target position can be located at a position that none of the mold clamping mechanisms can reach in the initial stage of the mold clamping operation, whereby deviation between the final target position and the average value of sensed positions can be obtained consistently. As a result, the mold clamping operation in the initial stage, controlled with reference to this deviation, can be made stable.

(7) A compression molding method according to any one of the above-indicated modes (1)–(6), wherein the compression molding comprises an injection press molding, and the injection press molding is executed by injecting molten resin material to fill the mold cavity defined by the stationary mold half and the movable mold half in a state of being parted by a predetermined amount, and then implementing the mold clamping operation. In order to ensure stable injection press molding, this mode allows a target level of mold clamping force to be consistently exerted on all molding compound filling the mold cavity, while minimizing an amount of tilt of the stationary mold half and movable mold half relative to each other. Thus, it is possible to consistently mold a desired molding with a high degree of precision.

(8) A compression molding method according to the above-indicated modes (3), wherein the step of obtaining the clamping control signal by adding the first control signal and the second control signal, further includes the steps of: setting the first control signal to 0 and obtaining the clamping control signal on the basis of the second control signal in the event that the average value of the sensed pressures in the mold clamping hydraulic cylinder mechanisms or the sensed pressure in any of the plurality of mold clamping hydraulic cylinder mechanisms lies in a preset blind area. According to this mode, small fluctuations and oscillations in the clamping control signal used in the mold clamping operation can be eliminated or minimized, thus achieving a stabilized mold clamping operation. Therefore, even where the target mold clamping force for mold clamping is switched in the course of the mold clamping operation, for example, unintentional and unwanted fluctuations in mold clamping pressure can be effectively avoided.

(9) A compression molding method according to the above-indicated mode (3) or (8), further comprising the steps of: sensing pressure in the plurality of mold clamping hydraulic cylinder mechanisms in the event of a pressure release to reduce pressure in the plurality of mold clamping hydraulic cylinder mechanisms after completing the mold clamping operation; calculating an average value of the pressure obtained; calculating a fourth control signal on the basis of deviation between a preset target value for pressure release and the average value of the pressure obtained; and obtaining the clamping control signal by adding the second control signal and the fourth control signal. According to this mode, even during the pressure release operation occurring after the compression molding operation using a predetermined mold clamping force, the mold clamping pressure can be reduced in a stable manner while eliminating or reducing tilt of the stationary mold half and the movable mold half relative to each other. This makes it possible to further improve quality consistency of moldings.

(10) A mold clamping apparatus comprising: (a) a stationary mold half and a movable mold half which cooperate to define therebetween a mold cavity; (b) a plurality of mold clamping mechanisms adapted to exert a mold clamping force across the stationary plate and the movable plate to bring about a mold clamping operation from a state of the stationary and movable mold halves being parted by a predetermined amount with molten resin material present in the mold cavity in order to effect a compression molding; (c) pressure sensors for sensing mold clamping forces in the plurality of mold clamping mechanisms to obtain sensed mold clamping forces; (d) a target mold clamping force setting member for presetting a target mold clamping force for mold clamping; (e) a first computing member for obtaining a first control signal on the basis of deviation between an average value of the sensed mold clamping forces in the plurality of mold clamping mechanisms and the target mold clamping force for mold clamping set by the target mold clamping force setting member; (f) position sensors for sensing positions of movable members of the plurality of mold clamping mechanisms to obtain sensed positions of the movable member; (g) a target position setting member for calculating an average value of the positions of the movable members in the plurality of mold clamping mechanisms, and setting the average value as a successive target position; (h) a second computing member for calculating a second control signal on the basis of deviation between each of the sensed positions of the movable members of the plurality of mold clamping mechanisms and the successive target position; and (i) a clamping control signal computing member for adding the first control signal and the second control signal and calculating a clamping control signal for each of the mold clamping mechanisms.

The mold clamping apparatus having structure according to the present invention is capable of advantageously implementing the aforementioned compression molding method according to the invention.

BRIEF DESCRIPTION OF THE DRAWINGS

The forgoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
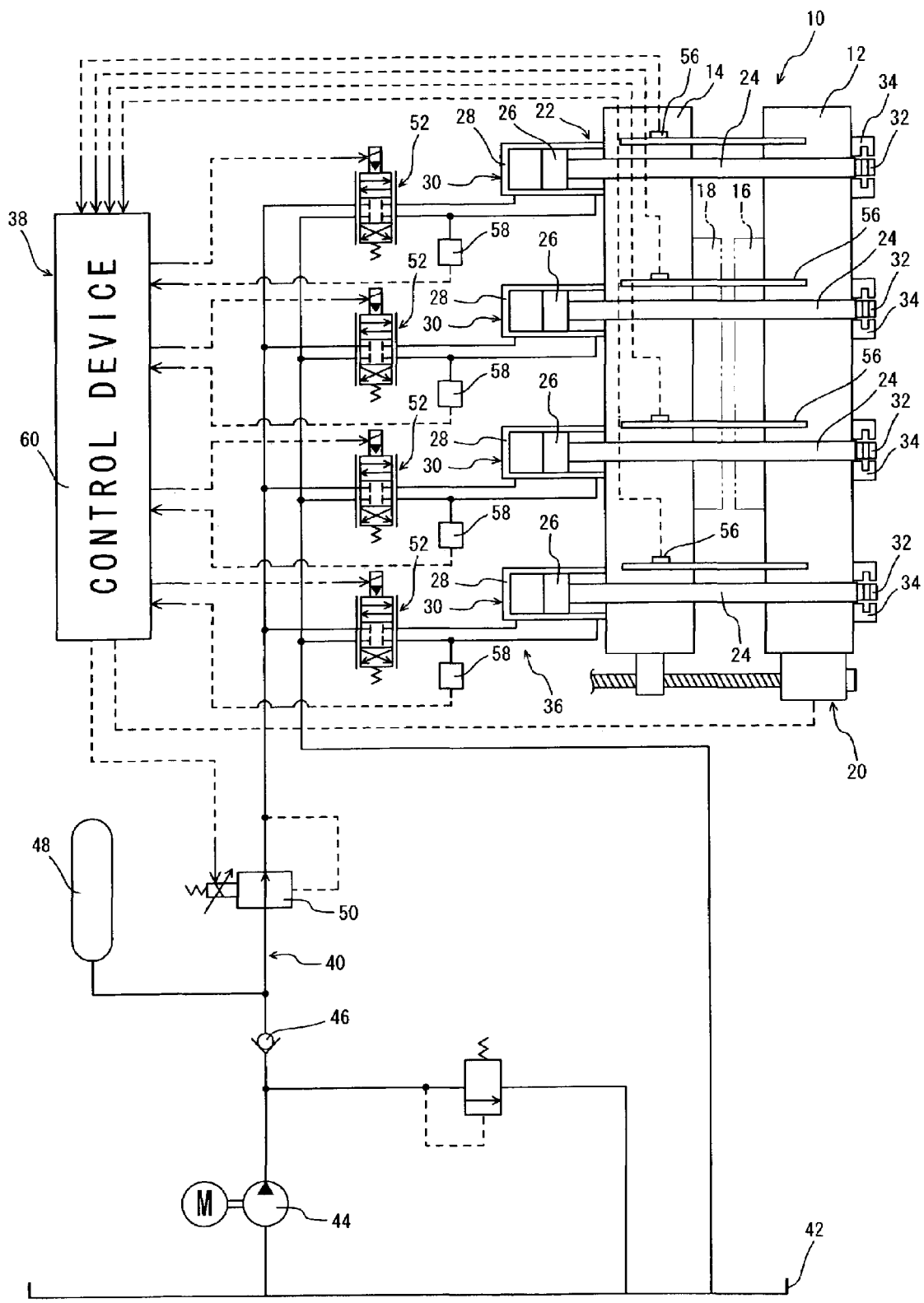
FIG. 1 is a view schematically showing a mold clamping apparatus constructed according to one embodiment of the invention.

Referring first to FIG. 1, there is shown a schematic diagram of a mold clamping apparatus 10 constructed according to one preferred embodiment of the invention, which is suitable for implementing a compression molding method according to the invention. This mold clamping apparatus 10 comprises a stationary plate 12 fixedly supported by means of an apparatus base (not shown) and a movable plate 14 positioned opposed to this stationary plate 12, with the movable plate 14 capable of relative displacement towards and away from the stationary plate 12. A stationary mold half 16 and a movable mold half 18, which cooperate to constitute a mold, are respectively attached to opposed faces of the stationary and movable plates 12, 14. This movable plate 14 is moved toward and away from the stationary plate 12 so that the stationary and movable mold halves 16, 18 are caused to undergo a mold closing or mold parting operation to be placed in a mold closing position or mold parting position. The stationary and movable mold halves 16, 18 are brought to the mold closing position to thereby define therebetween a mold cavity of a shape corresponding to the shape of a desired molding. Into the mold cavity, an injection apparatus (not shown) injects a molding compound, namely, synthetic resin material in a plasticized state, for compression molding.

Between the stationary plate 12 and the movable plate 14 is disposed a mold opening/closing device 20 composed of a servo motor and a screw feed mechanism, or a hydraulic side cylinder or the like, for causing the movable plate 14 to undergo displacement at high speed relative to the stationary plate 12 to effect the mold parting or closing operation. Likewise, a mold-clamping device 22 is disposed between the stationary plate 12 and the movable plate 14 for driving the movable plate 14 against the stationary plate 12 at high pressure to effect a mold clamping operation.

This mold-clamping device 22 includes four tie bars 24 as piston rods disposed across the space between the stationary plate 12 and the movable plate 14. Pistons 26 are fixed to ones of opposite ends of the tie bars 24 located on the side of the movable plate 14, respectively. These pistons 26 are respectively housed within four hydraulic cylinders 28 provided on the side of the movable plate 14, to thereby make up a total of four mold clamping hydraulic cylinder mechanisms 30 each functioning as a mold clamping mechanism of double action type. On the other hand, engaging recesses 32 are formed on the other end portions of the tie bars 24 located on the side of the stationary plate 12, respectively. Four pairs of half nuts 34, 34 are attached to the stationary plate 12 so as to be engageable with and disengageable from respective engaging recesses 32. With the half nuts 34, 34 in a disengaged state from the tie bars 24, high-speed mold parting/closing operations can be performed by the mold opening/closing device 20. With the half nuts 34, 34 moved into engagement with the tie bars 24 by means of an actuator (not shown), on the other hand, a drive force of the mold clamping hydraulic cylinder mechanisms 30 can be exerted across the stationary plate 12 and the movable plate 14 to effect the mold clamping operation.

A variety of mold clamping mechanisms including, but not limited to the arrangement described above, may be employed in the present invention, provided that both mold clamping and parallel control during compression molding can be performed by the same actuator. A possible example of the mold clamping mechanism may be arranged such that servomotors could be used in place of the mold clamping hydraulic cylinder mechanisms 30, and ball screws in place of tie bars 24. Where the servomotors are used, sensing of mold clamping force may be accomplished by sensing servomotor torque, or sensing pressure by means of a load cell.

Locations for installation of the mold clamping mechanism in the form of the mold clamping hydraulic cylinder mechanisms 30 or servomotors are not limited to the movable plate 14 side. Installation on the stationary plate 12 side is acceptable as well. The location for installation of mold clamping hydraulic cylinder mechanisms 30 or servomotors may alternatively be a rear plate provided separately from the stationary plate 12 and the movable plate 14. In this case, transmission of force to the movable plate 14 may be performed by a plurality of toggling mechanisms. The tie bars 24 may be designed to disengage from the stationary plate 12 or the movable plate 14 during parting of the mold. Alternatively, the tie bars 24 may be designed such that center axes of the tie bars 24 may be fixed across the stationary plate 12 and the movable plate 14, and engaging recesses 32 are formed onto the piston rods of the mold clamping hydraulic cylinder mechanisms 30 provided to the stationary plate 12 or the movable plate 14, which rods are disposed about the center axes to be slidably movable, whereby the tie bars 24 are formed by means of the center axes thereof and the piston rods. Each pair of half nuts 34, 34 may be disposed on the plate to which the mold clamping hydraulic cylinder mechanisms 30 or the servomotors are attached. The invention may be used in a vertical molding machine as well.

The mold clamping apparatus 10 further comprises a hydraulic mechanism 36 for the driving hydraulic cylinders 28 of the four mold clamping hydraulic cylinder mechanisms 30 that constitute the mold clamping device 22, and a control mechanism 38 for controlling operation of the hydraulic mechanism 36, and hence of the mold clamping device 22 and the mold opening/closing device 20.

The hydraulic mechanism 36 includes a hydraulic circuit 40 that comprises a drive part for supplying hydraulic working fluid to the four hydraulic cylinders 28, and a drain part for draining the hydraulic working fluid. The drive part of the hydraulic circuit 40 is operable for accumulating hydraulic working fluid by supplying hydraulic working fluid drawn from an oil tank 42 by means of a hydraulic pump 44 into an accumulator 48 via a check valve 46. The hydraulic working fluid is then supplied from the accumulator 48 via a pressure reducing valve 50 to the four mold clamping hydraulic cylinder mechanisms 30. Hydraulic working fluid passages in the mold clamping hydraulic cylinder mechanisms 30 are provided therein with solenoid-operated servo valve 52 comprising three-way changeover valves of center-closed type. By switching each servo valve 52, the pressurized fluid guided through the drive part of the hydraulic circuit 40 is selectively guided into the cylinder chamber of either the rod end or cylinder head end of the mold clamping hydraulic cylinder mechanism 30 of double action type, and is drained from the other cylinder chamber of the mold clamping hydraulic cylinder mechanism 30 through the drain part of the hydraulic circuit 40 into the oil tank 42. As a result of switching operation of the servo valves 52, the tie bars 24 of the mold clamping hydraulic cylinder mechanisms 30 are driven toward their protruded positions or retracted positions.

In the control mechanism 38, each mold clamping hydraulic cylinder mechanism 30 is equipped with a linear scale 56 functioning as position sensors for sensing a position of its movable member (stroke position), and a pressure sensor 58 for sensing pressure therein as mold clamping force. Further, the control mechanism 38 is equipped with a control device 60 that performs arithmetic processes while making reference to position sensor signals and pressure sensor signals received from the four linear scales 56 and four pressure sensors 58. This control device 60 controls operation of the four servo valves 52, the pressure reducing valve 50 and the mold opening/closing device 20 by means of control signals output therefrom so that the stationary and movable plates 12, 14 undergo molding operations such as the mold opening/closing operation and the mold clamping operation. In this embodiment, the linear scales 56 attached between the stationary and movable plates 12, 14 are adopted as position sensors, but instead a rotary encoder or potentiometer could be attached to the movable plate 14. Alternatively, adoptable is a member capable of directly sensing the stroke of the mold clamping hydraulic cylinder mechanism 30, for example.

There will be described in detail one operation mode in the mold clamping apparatus 10 of construction as described above for performing injection press molding by controlling the hydraulic mechanism 36 by means of the control mechanism 38 in order to drive the stationary plate 12 and the movable plate 14 using the mold opening/closing device 20 and the mold clamping hydraulic cylinder mechanisms 30. The following operation in the mold clamping apparatus 10 is performed in response to control input from the outside, by arithmetic processes executed by a CPU in accordance with a program which has been stored in ROM or RAM of the control device 60, on the basis of control signals output by control device 60.

First, initial setup for injection press molding is performed. Specifically, a predetermined stationary mold half 16 and movable mold half 18 are attached to the stationary plate 12 and the movable plate 14, respectively. With all of the pairs of half nuts 34, 34 of the stationary plate 12 disengaged from the tie bars 24, the stationary and movable plates 12, 14 are brought into the mold closing position to close the mold by means of the mold opening/closing device 20. The linear scales 56 set to zero or reset. Then, the movable plate 14 is moved by the mold opening/closing device 20 to a predetermined mold parting position to complete initial setup for injection press molding.

After initial setup for injection press molding has been completed, a start signal of an injection press molding is input to the control device 60. After receiving the start signal, the control device 60 performs a control of the drive of the movable plate 14 indicated by a timing chart of FIG. 8, according to the steps shown in FIGS. 2–7, in order to carry out the injection press molding.

First, at the start of the injection press molding, the mold opening/closing device 20 is driven to move the movable plate 14 at high speed in a mold closing direction in which the movable plate 14 is moved toward the stationary plate 12, in order to guide the movable plate 14 to an approach step starting position, which is a preset mold clamping starting position. Once the linear scales 56 confirms that the movable plate 14 has reached the approach step starting position, a currently effective driver is switched over from the mold opening/closing device 20 to the mold clamping hydraulic cylinder mechanisms 30, which functions as mold clamping mechanisms. The movable plate 14 is now moved by the four mold clamping hydraulic cylinder mechanisms in order to initiate control of a mold clamping operation. Upon initiation of the mold clamping operation control, the pairs of half nuts 34, 34 of the stationary plate 12 are engaged with the tie bars 24 of the mold clamping hydraulic cylinder mechanisms 30, so that the driving force of the mold clamping hydraulic cylinder mechanisms 30 is exerted across the stationary plate 12 and the movable plate 14.

Figure 8:
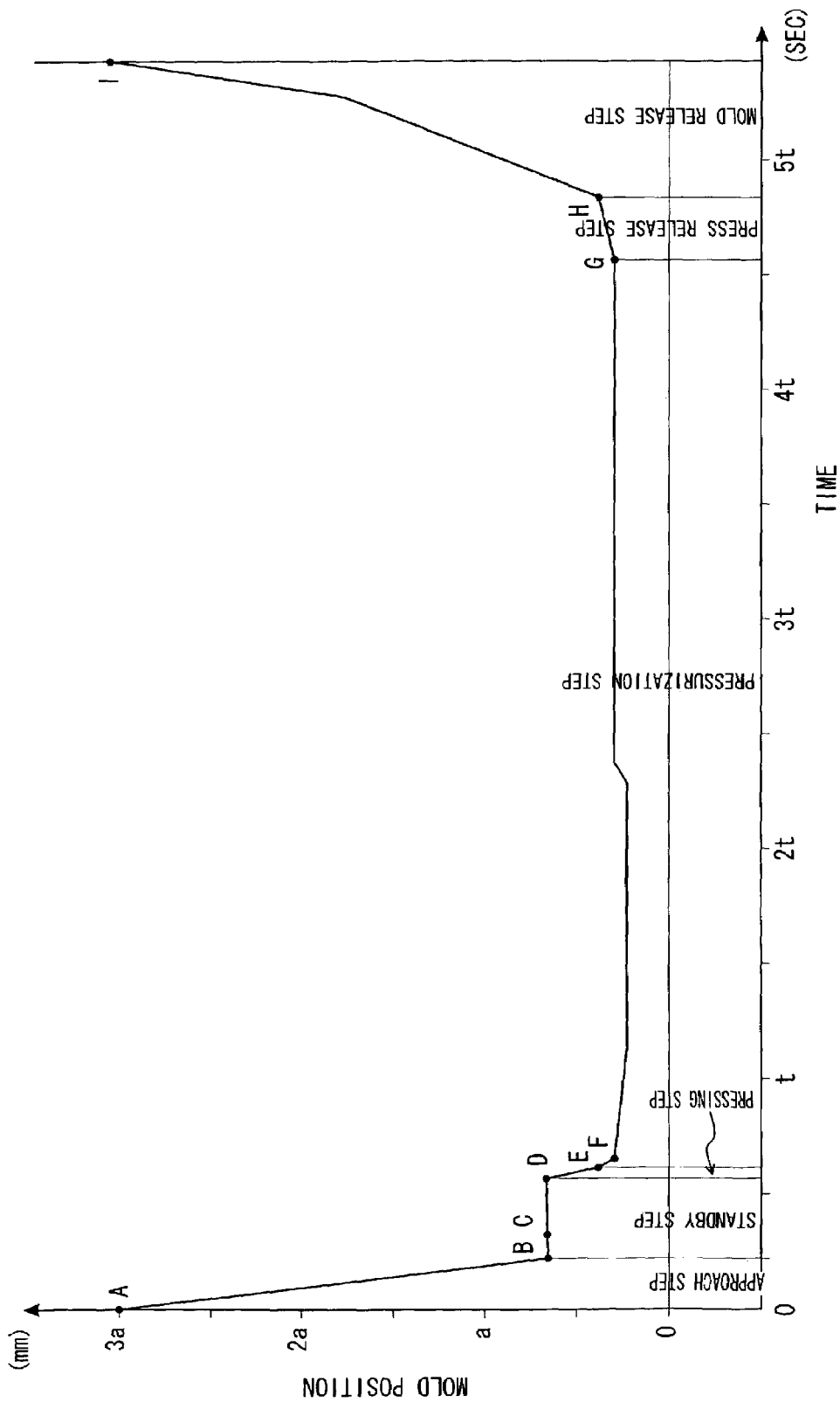
FIG. 8 is a time chart suitable for explaining the compression injection method of the invention executed by using the mold clamping apparatus of FIG. 1.

As shown in FIG. 8, the mold clamping operation control is performed in six steps: (1) an approach step, (2) a standby step, (3) a pressing step, (4) a pressurization step, (5) a pressure release step, and (6) a mold release step. It should be appreciated that these six steps are merely distinguished from one another in terms of control processes and the like in order to facilitate understanding of the description of the series of mold clamping operation, and that the mold clamping operations described hereinbelow are merely exemplary, with the mode of mold clamping operation control not being limited to these six steps.

Figure 2:
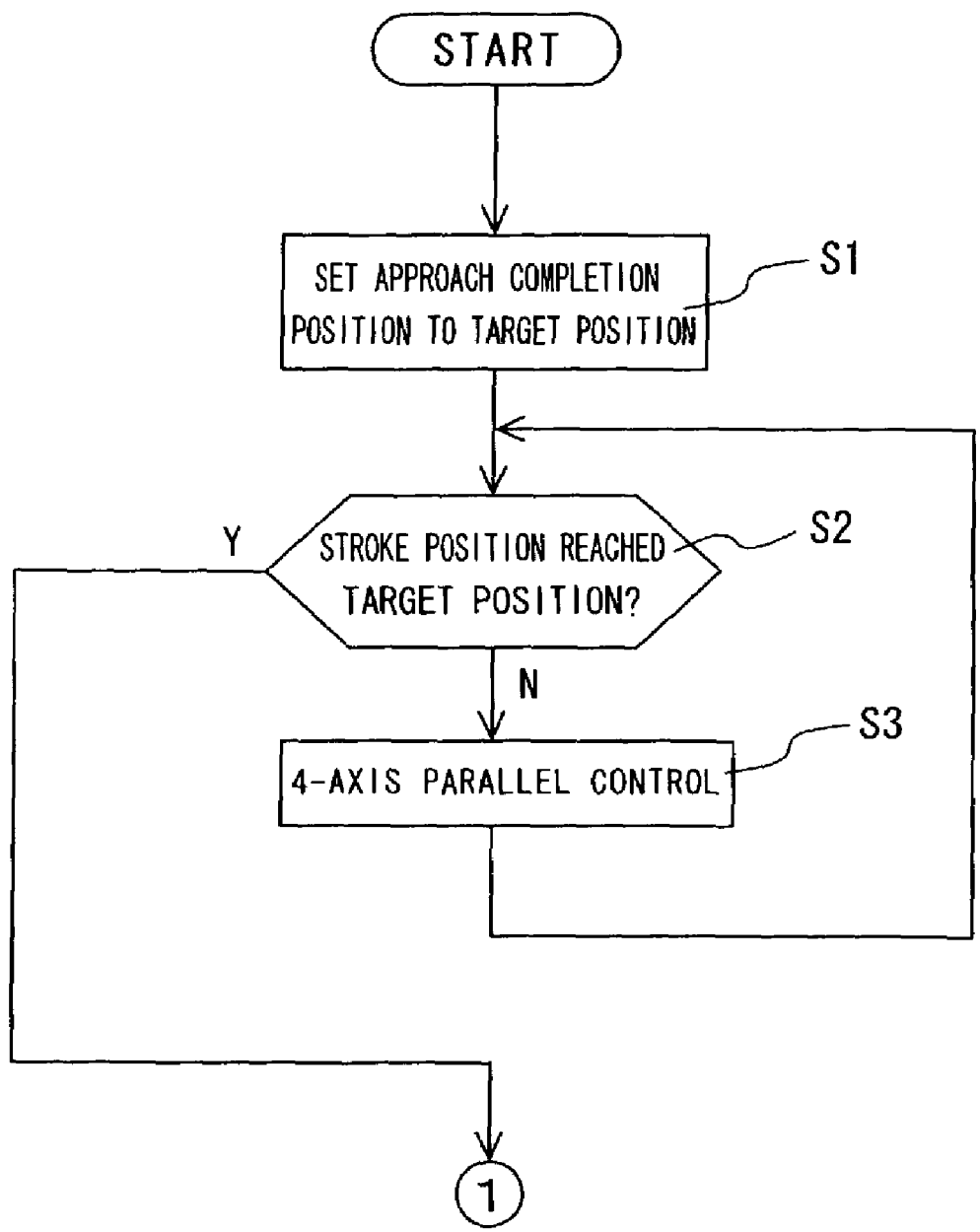
FIG. 2 is a flow chart for illustrating an approach step in a compression molding method according to one preferred embodiment of the invention, which is executed by using the apparatus of FIG. 1.
Figure 9:
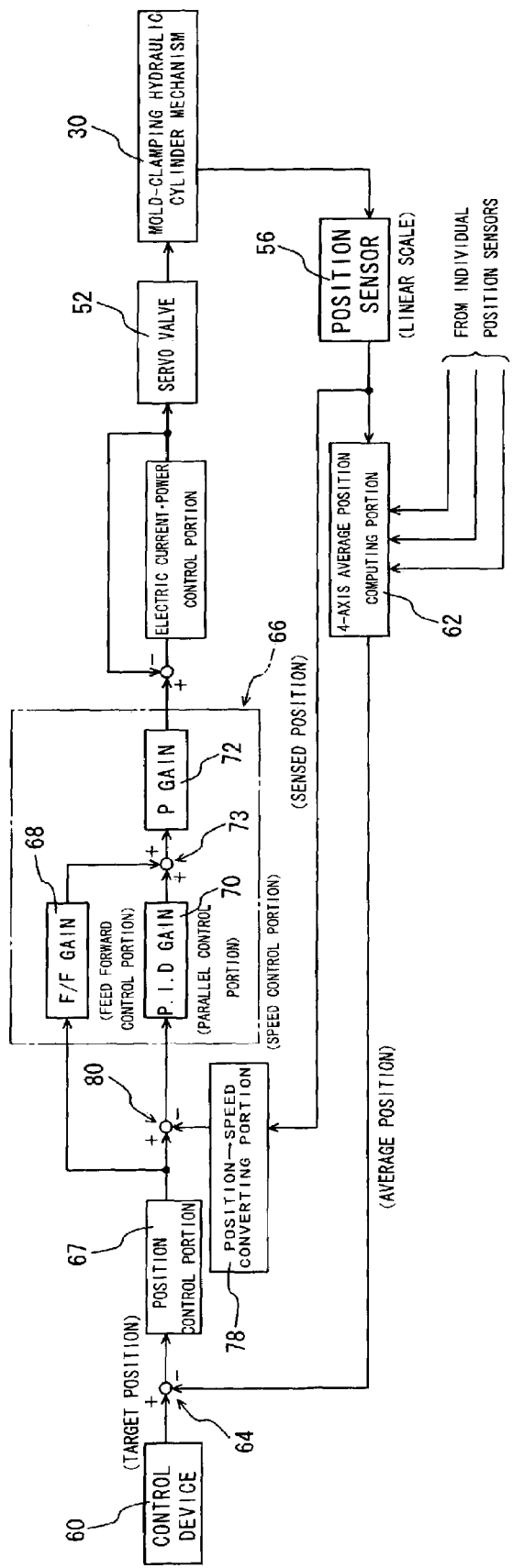
FIG. 9 is a block diagram illustrating one example of a control system for executing the approach step of FIG. 3.

In the approach step (1), a process according to the block diagram shown in FIG. 9 is executed according to the flow chart shown in FIG. 2, whereby operation of the four mold clamping hydraulic cylinder mechanisms 30 is controlled so as to carry out the mold clamping operation from point A to point B shown in FIG. 8. Specifically, as shown in FIG. 2, once the approach step is started, Step S1 is implemented to set an approach completion position entered in advance to a target position, and then Step S2 is implemented to make a determination as to whether sensed stroke position of the mold clamping hydraulic cylinder mechanisms 30 sensed by the linear scales 56 has reached the target position. The mold clamping hydraulic cylinder mechanisms 30 are driven until they reach the target position, whereby the movable plate 14 is moved toward the stationary plate 12 at a predetermined speed. While a negative decision is made in Step S2, Step S3 is executed so that four-axis parallel control is exercised continuously in order to mutually align the sensed stroke positions of the four mold clamping hydraulic cylinder mechanisms 30, and perform parallel control to prevent tilt of the movable plate 14 relative to the stationary plate 12, so that the stationary plate 12 and the movable plate 14 are mutually parallel.

This parallel control will be described in detail with reference to FIG. 9. First, a four-axis average position-computing portion 62 calculates the average value of the sensor signals applied from the linear scales 56 of the four mold clamping hydraulic cylinder mechanisms 30. Then, a subtracter 64 compares the resultant average value (average stroke position) with the target position at completion of approach (target stroke position) applied in advance from the control device 60, and calculates the deviation in position between the average stroke position and the target position. If deviation in position is greater than zero, a position control portion 67 converts a speed signal in order to obtain a speed signal of a magnitude corresponding to the deviation in position. On the basis of this speed signal, a speed control portion 66 obtains a control signal. In consideration of the objective injection press molding, the target stroke position is set to a position wherein the stationary mold half 16 and the movable mold half 18 are parted by a given amount of press from a mold clamping position where the stationary and movable mold halves are clamped together completely.

The speed control portion 66 performs a proportional control process by adding values of feed forward control and parallel control (differential/integral control). Described in detail, the feed forward control is executed such that some of the speed signals obtained by the position control portion 67 are applied to a feed forward control portion 68 of the speed control portion, in order to be processed by means of feed forward gain, thereby obtaining a control signal for equally advancing the mold clamping hydraulic cylinder mechanisms 30.

Next described in detail is the parallel control (differential/integral control), wherein the speed control portion 66 performs both of the speed control and the parallel control for each individual mold clamping hydraulic cylinder mechanism 30 in a feed back control fashion. The speed control is performed in order to control the four mold clamping hydraulic cylinder mechanisms 30 to guide them overall to the target position, using the average position of the four mold clamping hydraulic cylinder mechanisms 30 as an indicator. The parallel control, on the other hand, is performed in order to align the positions of the mold clamping hydraulic cylinder mechanisms 30 relative to one another in order to reduce tilting of the stationary plate 12 and the movable plate 14 relative to each other. More specifically, a position of the axis of one target mold clamping hydraulic cylinder mechanism 30 is sensed by the corresponding linear scale 56, initially. Then, a position sensor signal output from the linear scale 56, which represents the sensed position of the axis, is converted to a speed signal by a position→speed converting portion 78. Subsequently, a subtracter 80 provided in an another control system branched from the position control portion 67, which is separated from the control system that performs the aforesaid feed forward control, obtains the difference between the speed signal that has been converted by the aforesaid position→speed converting portion 78 and the speed signal applied to a parallel control portion 70 from the position control portion 67. The obtained difference is subjected to differential/integral processing in the parallel control portion 70 of the speed control portion 66, and then the control signal processed by means of the aforesaid feed forward control is added in an adder 73, and further processed by means of proportional gain 72. By means of the above arrangement, the parallel control portion (ID gain) 70 can perform a feed back control so that stroke positions of individual mold clamping hydraulic cylinder mechanisms 30 are brought into approximation with the average position of the four mold clamping hydraulic cylinder mechanisms 30 as successive target stroke position, on the basis of deviation between average position of the successively changing four mold clamping hydraulic cylinder mechanisms 30 and sensed positions of individual mold clamping hydraulic cylinder mechanisms 30.

Since the speed control portion 66 is arranged in this way, the parallel control portion (ID gain) 70 can easily achieve one adjustment to effectively realize parallel control to reduce deviation in relative position of the four mold clamping hydraulic cylinder mechanisms 30, as well as another adjustment to effectively realize mold clamping speed control to guide the four mold clamping hydraulic cylinder mechanisms 30 overall to the target position by means of feed forward gain of the feed forward control portion 68. In the present embodiment, a target position setting member is configured including the four-axis average position computing portion 62 that calculates average position of the successively changing four mold clamping hydraulic cylinder mechanisms 30, and a second computing member for calculating a second control signal on the basis of deviation between sensed stroke position and successive target stroke position is configured including the subtracters 76, 80, the position→speed converting portion 78, the parallel control portion (ID gain) 70, and the proportional gain 72. Movement of the movable plate 14 up to the approach completed position in the injection press molding may be carried out in the parting direction after first moving the movable plate 14 to a mold-closing completion position. In injection compression molding, after the approach step and standby step (described later), the movable plate 14 moves in the parting direction due to injection and the subsequent pressing step (or pressurization step) is started.

Figure 3:
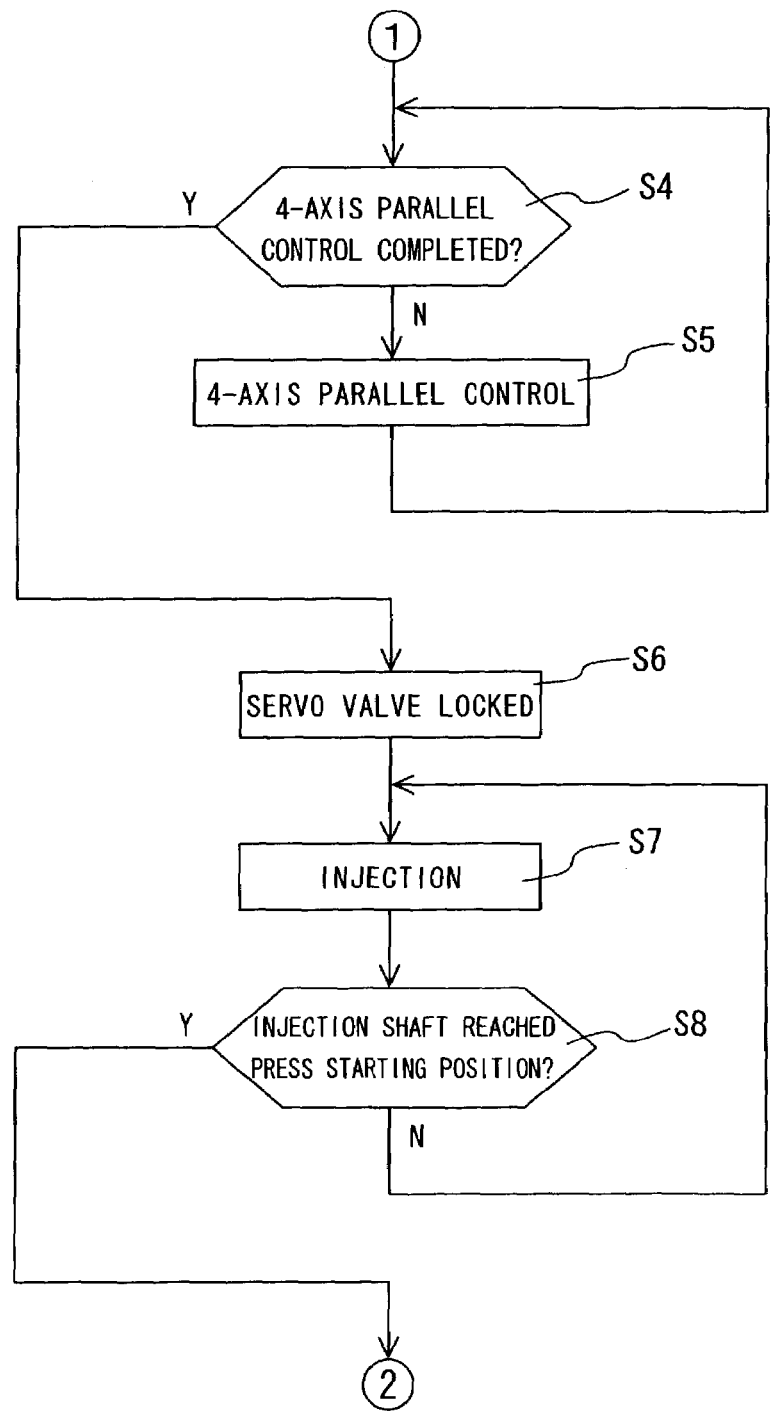
FIG. 3 is a flow chart for illustrating a standby step successive to the approach step of FIG. 2.

Once the approach step has been completed by means of the average position of the four mold clamping hydraulic cylinder mechanisms 30 reaching the target position, the subsequent standby step (2) is started. In this standby step (2), a process according to the flow chart shown in FIG. 3 is executed, whereby operation of the four mold clamping hydraulic cylinder mechanisms 30 is controlled so as to carry out the mold clamping operation from point B through point C and on to point D shown in FIG. 8. Specifically, as shown in FIG. 3, Step S4 is implemented to determine as to whether parallel control to reduce relative positional deviations of the four mold clamping hydraulic cylinder mechanisms 30 has been completed and the positions of all mold clamping hydraulic cylinder mechanisms 30 are now stable. Until parallel control has been completed, namely until an affirmative decision is made in Step S4, positions of the four mold clamping hydraulic cylinder mechanisms 30 are controlled to be parallel to one another in Step S5. When this parallel control has been completed with the affirmative decision made in Step S4 (point C in FIG. 8), Step S6 is then implemented so that the servo valves 52 of the four mold clamping hydraulic cylinder mechanisms 30 are locked, whereby the movable plate 14 is held stationary at the target position in a parallel state relative to the stationary plate 12. In this servo locked state, Step S7 is implemented so that an injection device (not shown) performs an injection operation to inject a predetermined quantity of molten resin material as a molding compound into the mold cavity defined by and between the stationary and movable mold halves 16, 18 closed at the target position.

During the injection operation by the injection device, Step S8 is implemented to sense the position of the injection screw or other injection shaft in the injection device in order to execute the standby process until the position of the injection shaft reaches a preset press starting position. To improve stability and molding cycle of the molding operation, the press starting position (point D in FIG. 8) is preferably set up to completion of the injection operation of molten resin material into the mold cavity by the injection device.

Figure 4:
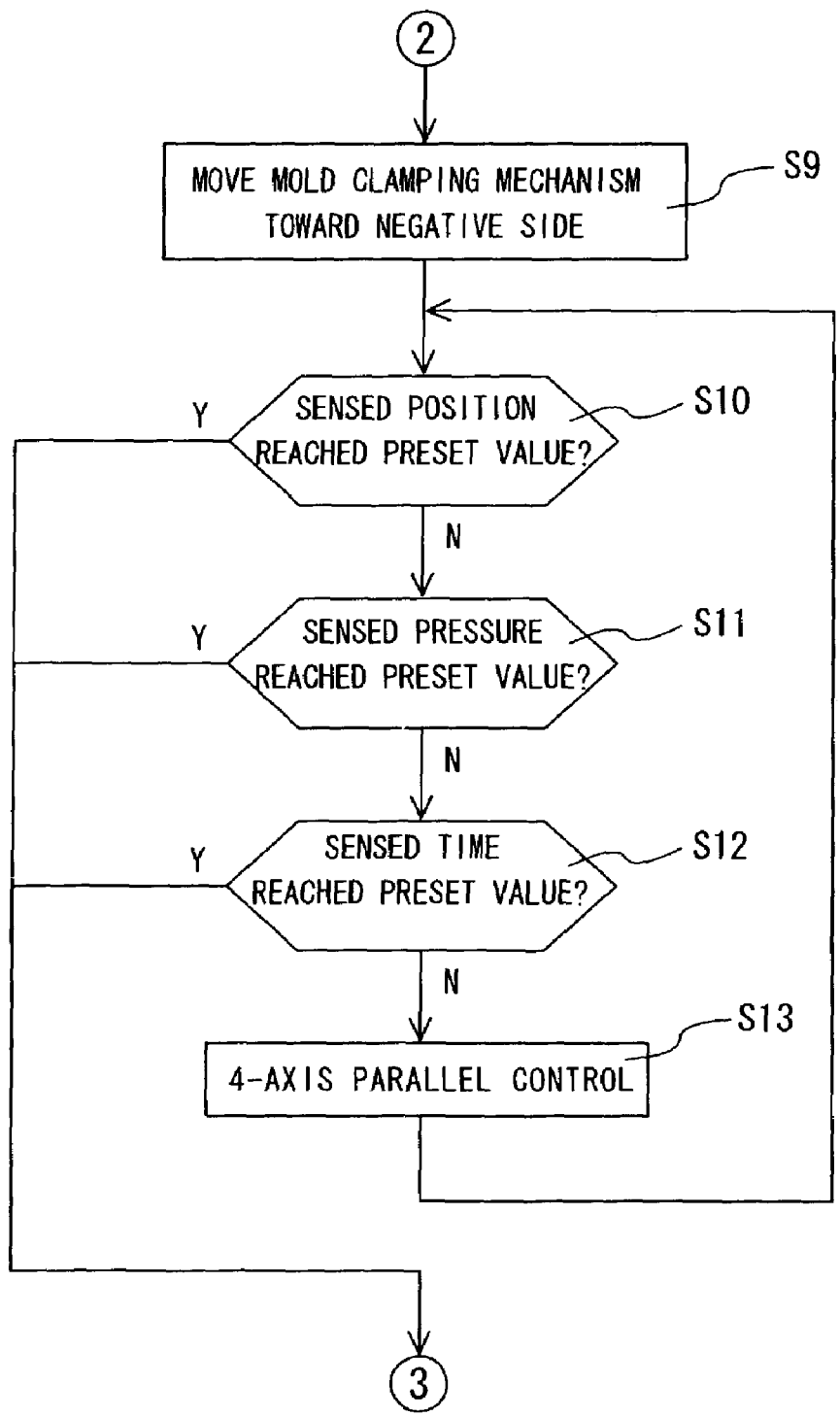
FIG. 4 is a flow chart for illustrating a pressing step successive to the standby step of FIG. 3.

When it is sensed that the injection shaft reaches the press starting position with an affirmative decision made in Step S8, and it has been verified that the predetermined quantity of molten resin material has been injected into the mold cavity, the standby step is concluded, and the pressing step (3) then is started as the initial stage of the mold clamping operation. In this pressing step (3), a process according to the flow chart shown in FIG. 4 is executed so that operation of the four mold clamping hydraulic cylinder mechanisms 30 is controlled so as to carry out the mold clamping operation from point D to point E shown in FIG. 8. Specifically, as shown in FIG. 4, when the pressing step is started, first, in Step S9, a final target position (final target stroke position) for mold clamping in the four mold clamping hydraulic cylinder mechanisms 30 is set to −2.0 mm, and operation of the four mold clamping hydraulic cylinder mechanisms 30 is controlled so that the average position of the four mold clamping hydraulic cylinder mechanisms 30 equals this final target stroke position.

Regarding the final target stroke position, with the completely closed state of the stationary and movable mold halves 16, 18 designated as zero position, displacement in the mold parting direction therefrom is represented by the + symbol. Namely, by setting a value of −2.0 mm as the target position, i.e. a value on the negative side (where parting direction is designated as the positive side one) that cannot actually be achieved, it becomes possible during press molding to reliably move all of the mold clamping hydraulic cylinder mechanisms 30, and hence to the movable plate 14, towards the mold clamping direction.

In this pressing step, Steps S10–S12 are implemented to monitor stroke positions of the mold clamping hydraulic cylinder mechanisms 30, sensed mold clamping forces (the sensed pressure), and time, respectively. This pressing step is executed until any of these values reaches a preset value. Also, during the mold clamping operation in the pressing step, Step S13 is implemented so that 4-axis parallel control carries out continuously, whereby the stationary and movable plates 12, 14 are parallel-controlled. The value of mold clamping force set in Step S11 is smaller than the value giving the maximum pressure, which is a target mold clamping force of the mold clamping mechanism set in the pressurization step described later for injection press molding. Preferably, the value of mold clamping force set in Step S11 is determined such that a mold clamping force set appropriately within a range of 60–95% of the mold clamping target pressure equals a target switchover mold clamping force (target switchover pressure) at which the pressing step is terminated and moves on to the pressurization step. In Step S10, the determination is preferably made taking into consideration an average values of the four mold clamping mechanisms (mold clamping hydraulic cylinder mechanisms 30) as sensed position. An average value may be used in Step S11 as well. In the present embodiment, Step S10 and Step S12 are arranged for back up of Step S11, and normally, Step S11 goes on to the next step.

Figure 10:
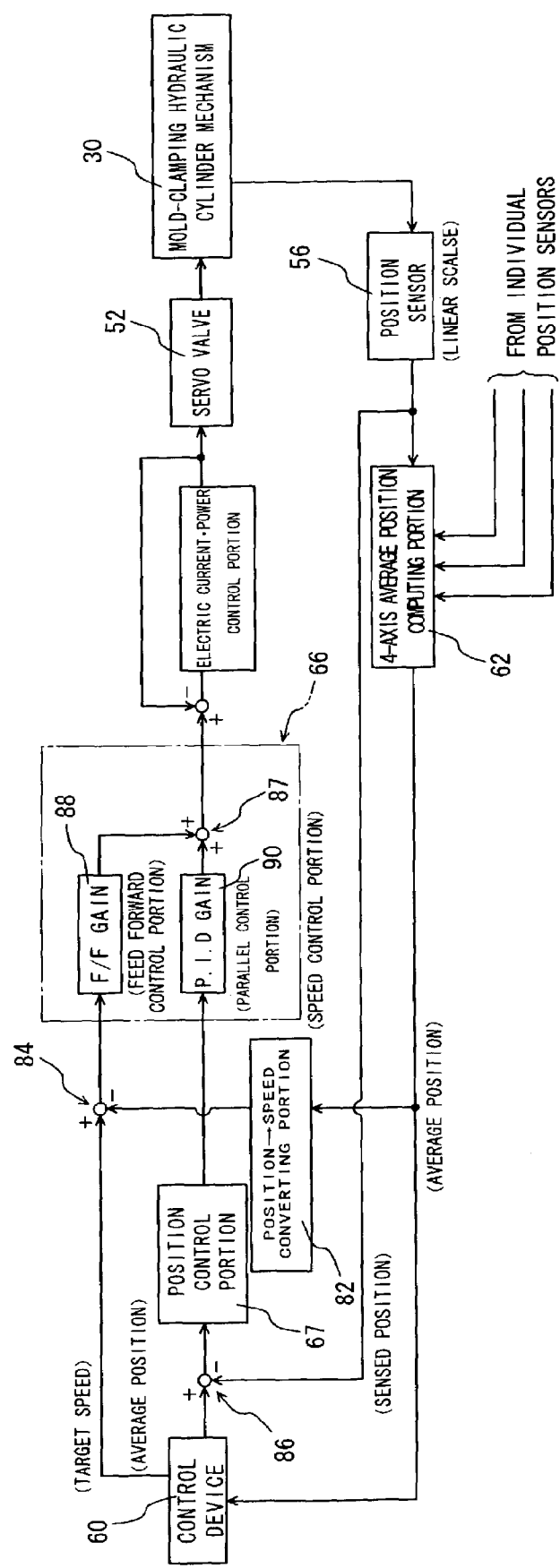
FIG. 10 is a block diagram illustrating one example of a control system for executing the pressing step of FIG. 4.

A specific control process is illustrated in FIG. 10. Turning first to a description of feed forward control, the control device 60, which serves as a target mold clamping force setting member (target pressure setting member), obtains a preset target speed in the pressing step target speed, while computing an average value (average position) of the sensor signals received from the linear scales 56 of the four-axis average position computing portion 62, on the basis of with the sensor signals from the linear scales 56. The resultant average value is converted to a speed signal by a position→speed converting portion 82, and then is transmitted to a subtracter 84, whereby the subtracter 84 calculates deviation from the target speed (instruction value) provided by control device 60 for providing a corresponding deviation signal. The deviation signal is transmitted to the speed control portion 66, and processed by given control gain (feed forward gain) in a feed forward control portion 88 of the speed control portion 66, thereby obtaining a third control signal for use in the pressing step. The speed signal processed by means of this feed forward gain is a control signal applied equally to each mold clamping mechanism (mold clamping hydraulic cylinder mechanism 30). In this embodiment, the average position in the four mold clamping hydraulic cylinder mechanisms 30 is converted to a speed signal in order to calculate deviation of the average position from the final target stroke position for mold clamping, which is applied from the control device 60. Practically, deviation could instead be substantially calculated using stroke position as an indicator.

Turning now to a description of parallel control, the average position calculated by four-axis average position computing portion 62 is input to the control device 60 in order to obtain a reference signal for the parallel control. The average position set as a successive target position (successive target stroke position) and the sensed position by way of a stroke position sensed by the linear scale 56 in each mold clamping hydraulic cylinder mechanism 30 is transmitted to a subtracter 86 where the difference between the two is taken, whereby deviation of position (stroke position) among the four mold clamping hydraulic cylinder mechanisms 30 is calculated individually. Then, the resultant deviation is converted into a speed signal by means of the position control portion 67, and transmitted as a position/speed conversion instruction value to the speed control portion 66. In the speed control portion 66, the speed signal is multiplied by a predetermined control gain (proportional gain, differential gain and integral gain) in order to obtain a second instruction value in the form of a control signal for parallel control (hereinafter referred to as "second control signal"). The second control signal is then added to the aforementioned third control signal in an adder 87, thereby obtaining a clamping control signal for each mold clamping hydraulic cylinder mechanism 30. That is, the second control signal is obtained on the basis of deviation between the sensed position in each mold clamping mechanism and the successive target position.

When performing the control on the basis of deviation from the average position of the four mold clamping hydraulic cylinder mechanisms 30 while using the target speed as an indicator, which is provided by the control device 60 for driving the four mold clamping hydraulic cylinder mechanisms 30 to the target positions, the speed control portion 66 applies feed forward gain to the deviation in the feed forward control portion 88, and performs the speed control in an open loop fashion equally for the respective mold clamping hydraulic cylinder mechanisms 30, until the average position for the four mold clamping hydraulic cylinder mechanisms 30 reaches the target position. Additionally, when performing the control based on deviation from sensed positions of the four mold clamping hydraulic cylinder mechanisms 30 with the average value of the four mold clamping hydraulic cylinder mechanisms 30 as an indicator as successive stroke position, the speed control portion 66 applies PID gain to the deviation in a parallel control portion 90, and performs the speed control in a feedback control fashion to bring the stroke positions of the four mold clamping hydraulic cylinder mechanisms into approximation with the average positions.

The use of the speed control portion 66 permits adjustment of the feed forward gain in the feed forward control portion 88 and the PID gain in the parallel control portion 90, whereby a mold clamping operation to move the movable plate 14 to the target position in order to execute the pressing step, and a parallel operation to reduce a tilt of the stationary plate 12 and the movable plate 14 relative to each other, can be performed in a stable manner by means of easily setting the proper control gain for each respectively, and adjustment of operations by means of control gain can be performed easily.

Figure 5:
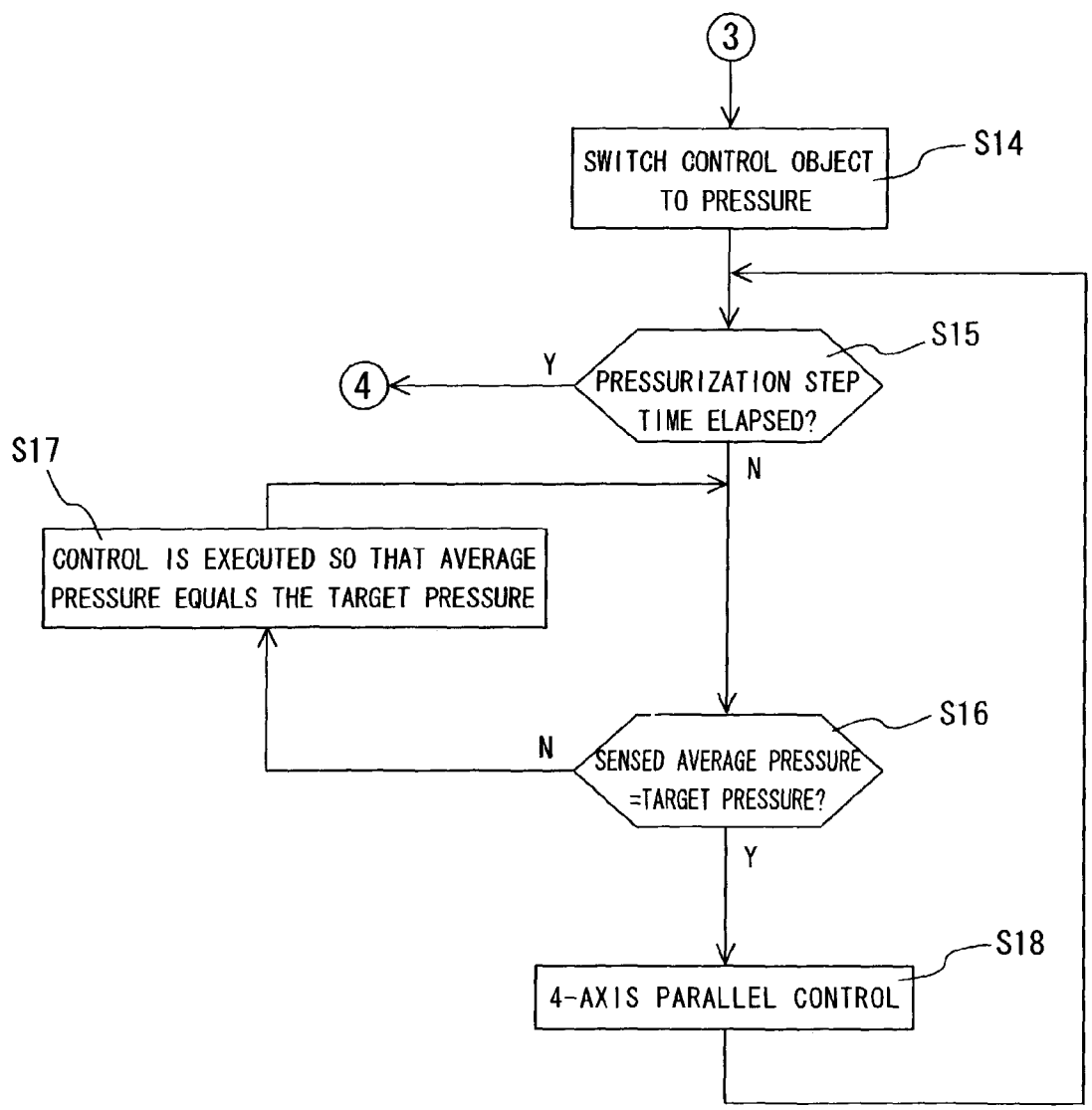
FIG. 5 is a flow chart for illustrating a pressurization step successive to the pressing step of FIG. 4.

When it is determined in Steps S10–S12 that a sensed position, a sensed mold clamping force (sensed pressure), or a sensed time has reached a preset pressing step completion value, the pressing step is concluded, and the pressurization step (4) is started. In this pressurization step, a process according to the flow chart shown in FIG. 5 is executed, whereby operation of the four mold clamping hydraulic cylinder mechanisms 30 is controlled so as to carry out the mold clamping operation from point E through point F (completion of injection) and on to point G shown in FIG. 8. More specifically, as shown in FIG. 5, when the pressurization step is started (point E), Step S14 is implemented to switch the object of control of the mold clamping mechanisms (mold clamping hydraulic cylinder mechanisms 30). Namely, whereas the object of control of the mold clamping mechanisms (mold clamping hydraulic cylinder mechanisms 30) in the pressing step was their positions (stroke positions), in the pressurization step, the substantial object of control now switches to the mold clamping force of the mold clamping mechanisms (mold clamping pressure of the mold clamping hydraulic cylinder mechanisms 30). That is, the mold clamping hydraulic cylinder mechanisms 30 are operation-controlled so that the average value (average pressure) sensed by the pressure sensors 58 in the four mold clamping hydraulic cylinder mechanisms 30 equals a preset target pressure for mold clamping. The value of the mold clamping target pressure for mold clamping hydraulic cylinder mechanisms 30 may be modified in the course of the mold clamping operation.

Subsequently, Step S15 is executed to read an elapsed time from a timer. If a predetermined pressurization step time has not yet elapsed, a control flow goes to Step S16 to make a determination as to whether the average value of actually measured pressure of the four mold clamping hydraulic cylinder mechanisms 30 has reached a predetermined target value for mold clamping, and if the set pressure has not yet been reached, the successive Step S17 is executed, whereby the four mold clamping hydraulic cylinder mechanisms 30 is controlled so that the average value of actually measured pressure equals the target pressure. Then, returning to Step S16, a determination is made as to whether the average value of actually measured pressure has reached the predetermined target value for mold clamping. On the other hand, if it is determined in Step S16 that the average pressure has reached the target pressure, the control flow goes to Step S18 wherein four-axis parallel control is performed continuously through the period of the pressurization step, in order to parallel control the stationary plate 12 and the movable plate 14.

Figure 11:
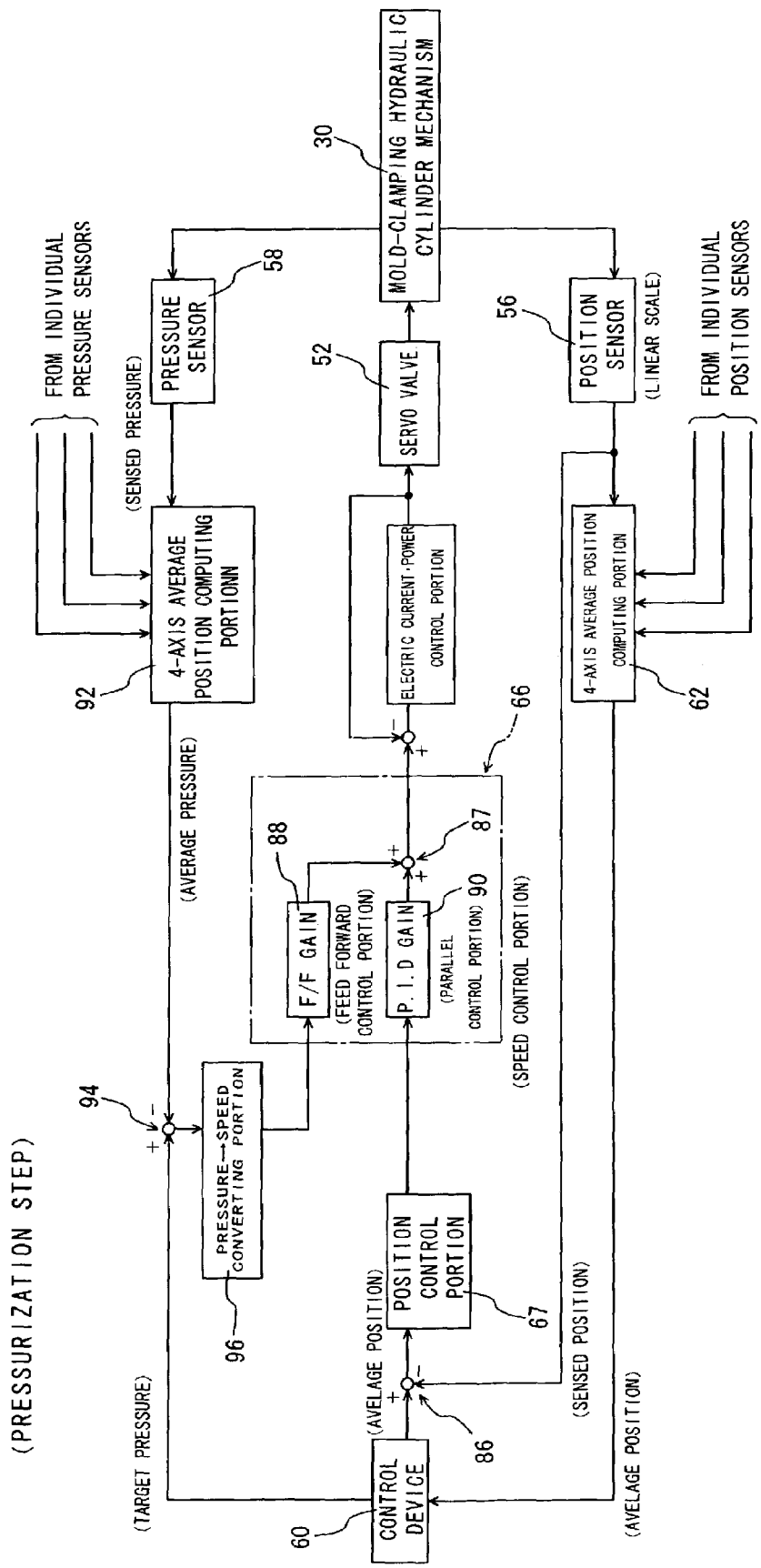
FIG. 11 is a block diagram illustrating one example of a control system for executing the pressurization step of FIG. 5.

The specific control process is shown in FIG. 11. First, there will be described a feed forward control wherein a mold clamping pressure in each mold clamping hydraulic cylinder mechanism 30 is monitored as an object of control. Initially, a predetermined target value of a mold clamping force (instruction value) for use in the pressurization step is obtained in the control device 60, and the average value (average pressure) of sensed mold clamping forces (pressures) sensed by the pressure sensor 58 is computed in a four-axis average pressure computing portion 92, using the sensor signals received from the pressure sensors 58, which sense mold clamping force of the four mold clamping hydraulic cylinder mechanisms 30. The difference between the resultant average mold clamping force (average pressure) and a preset target mold clamping force (target pressure) is calculated by a subtracter 94. The obtained deviation in the mold clamping force (pressure deviation) is converted by a pressure-speed converting portion 96 into a mold clamping force/speed conversion instruction value (pressure/speed conversion instruction value) in the form of a first speed signal. The first speed signal is transmitted to the speed control portion 66, and predetermined control gain (feed forward gain) is applied by the feed forward control portion 88 of the speed control portion 66, whereby it is obtained a second speed signal corresponding to the first control signal that is applied to each mold clamping hydraulic cylinder mechanism 30 in the pressurization step. That is, the first control signal is computed on the basis of deviation between the preset target mold clamping force and the average value of the sensed mold clamping forces in the plurality of the mold clamping mechanisms.

In the present embodiment, a first computing member for calculating a first control signal on the basis of deviation between the average pressure and the target pressure comprises the subtractor 94 and the speed control portion 66. In the pressurization step, as described hereinabove, the substantial object of control is the mold clamping pressure, and a speed signal is calculated on the basis of deviation between the target pressure and the average pressure. Accordingly, the speed signal is output when there is a difference between the target pressure and the average pressure, and when the target pressure and the average pressure coincide, the target speed provided by the control portion 60 is maintained at zero. Further, conversion of pressure deviation to a speed signal can be performed according to an equation established by proportionally associating pressure and speed in advance. Preferably, a determination may be made as to whether a value selected from average pressure in mold clamping hydraulic cylinder mechanisms 30 or sensed pressure sensed by any of the pressure sensors 58 lies within a preset blind area, and in the event when the value is within the blind area, the signal output from the pressure→speed converting portion 96 to the adder 87 may go to zero. The presence of such a blind area makes it possible to prevent unintended or unwanted fluctuations in mold clamping pressure when, for example, the target pressure is modified. The aforementioned control may be modified such that the target pressure converted to the speed instruction value and the average pressure converted to the speed are compared to each other.

While the parallel control is carried out continuously through the period of the pressurization step, as shown in FIG. 11, this parallel control is similar to that in the pressing step described previously, and no redundant description of the control will be provided.

In the pressurization step as well, the four mold clamping hydraulic cylinder mechanisms 30 are operated under control based on deviation from an average pressure of the four mold clamping hydraulic cylinder mechanisms 30 from the target pressure provided by the control device 60 as an indicator to drive the four mold clamping hydraulic cylinder mechanisms 30 to the target pressure. During this control, a feed forward gain 88 is applied to the deviation, and a speed control is performed in an open-loop fashion until the average pressure for the four mold clamping hydraulic cylinder mechanisms 30 reaches the target pressure. In conjunction therewith, the four mold clamping hydraulic cylinder mechanisms 30 are driven under control based on deviation from sensed positions of the four mold clamping hydraulic cylinder mechanisms 30 with the average value of the four mold clamping hydraulic cylinder mechanisms 30 as an indicator as successive stroke position. During this control, the deviation is subjected to PID gain in a parallel control portion 90, and the speed control is performed in a feedback loop fashion to bring the stroke positions of the four mold clamping hydraulic cylinder mechanisms into approximation with the average position.

Like the pressing step, this pressurization step is performed by adjusting the feed forward gain of the feed forward control portion 88 and each gain of PID gain of the parallel control portion 90, whereby a mold clamping operation to drive the movable plate 14 to the target mold clamping force (target pressure) in order to execute the pressurization step, and a parallel operation to reduce tilt of the stationary plate 12 and the movable plate 14 relative to each other, can each be performed in a stable manner by means of easily setting the proper control gain for each separately, and adjustment of operations by means of control gain can be performed easily. In the present embodiment, the control signal computing member for adding the first instruction value and the second instruction value (including negative addition) to calculate a clamping control signal for each mold clamping hydraulic cylinder mechanism 30 comprises the adder 87. In the pressurization step, in the initial stage thereof the importance of parallel control is relatively high since parallelism of the movable plate 14 is not maintained due to the occurrence of eccentricity of a gate position, but in the latter half parallelism of the movable plate 14 is generally maintained, so control of pressure becomes relatively more important.

Figure 6:
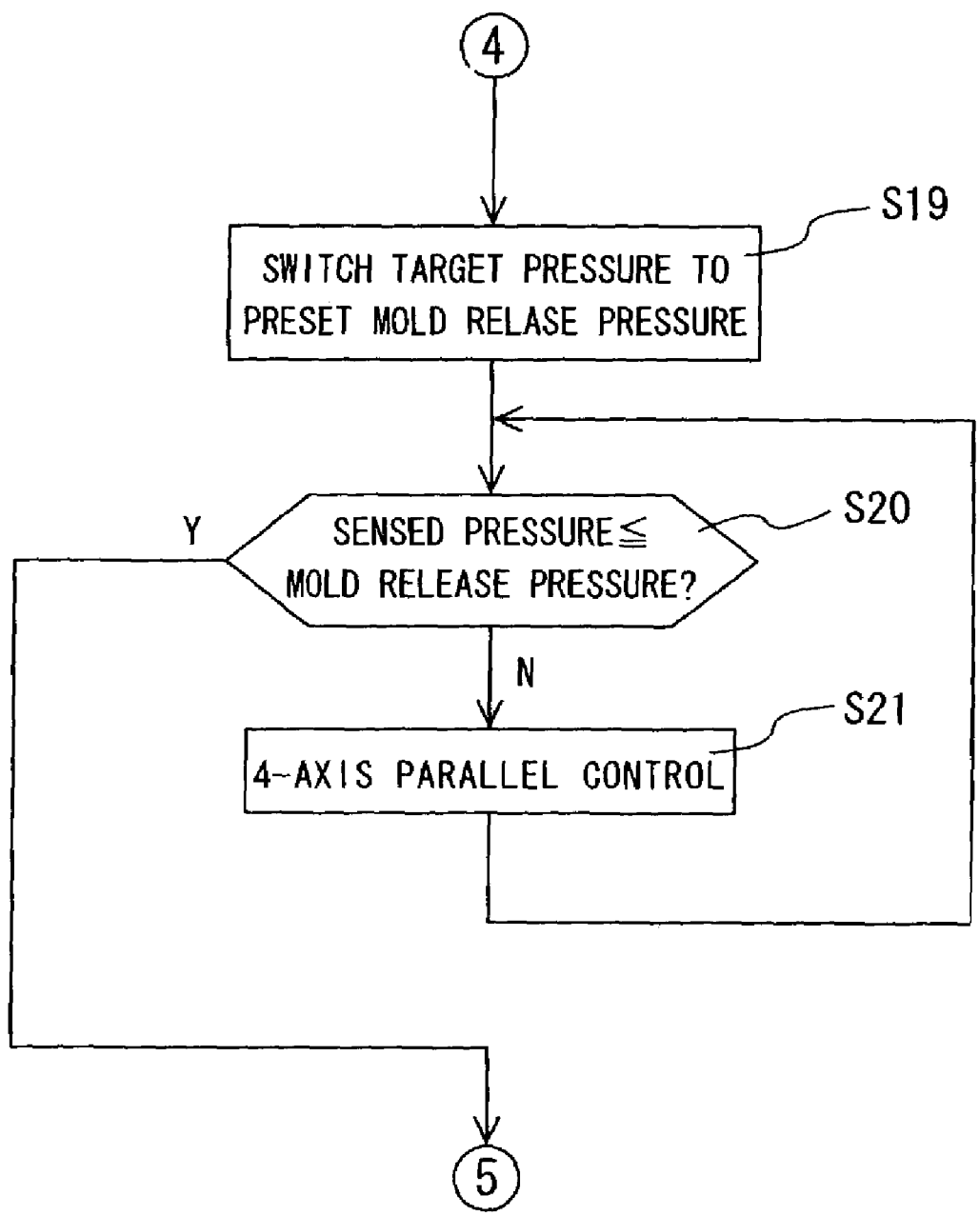
FIG. 6 is a flow chart for illustrating a pressure release step successive to the pressurization step of FIG. 5.

In Step S15 of the pressurization step, once it is determined that the pressurization step has been completed, a pressure release step (5) is started. In this pressure release step, a process according to the flow chart shown in FIG. 6 is implemented, whereby operation of the four mold clamping hydraulic cylinder mechanisms 30 is controlled so as to carry out a pressure release operation from point G through point H shown in FIG. 8. Specifically, as shown in FIG. 6, when the pressure release step is started, first in Step S19, it is implemented to switch the target pressure of the four mold clamping hydraulic cylinder mechanisms 30 to a preset mold release pressure, thereby initiating a pressure reduction operation for a mold clamping force (mold clamping pressure). Next, in Step S20, a determination is made as to whether the average mold clamping force (average pressure) of actual sensed mold clamping force (sensed pressure) has reached this target pressure. If the average pressure has not reached the target pressure, the control flow proceeds to Step S21, and continues the pressure reduction operation while implementing four-axis parallel control. On the other hand, if in Step S20 it is determined that the average pressure has reached the target pressure, the pressure release step is terminated.

The specific control process in the pressure release step can be realized, for example, with a control system generally similar to that in the pressurization step shown in FIG. 11, by modifying the target pressure provided by the control device 60 to the mold release pressure as the target pressure for the pressure release operation, and applying a predetermined gain (feed forward gain), which is obtained on the basis of deviation between this target pressure for the pressure release and the average value of sensed pressure of the mold clamping hydraulic cylinder mechanisms 30 sensed by the pressure sensors 58, to obtain a fourth instruction value or a fourth control signal, in order to control the four electromagnetic servo valves 52. In the present embodiment, however, the pressure release process is carried out by means of a pressure reducing control procedure of the four electromagnetic servo valves 52 and pressure reducing valve 50 (see FIG. 1) through slope output on the basis of deviation between the target pressure and average pressure. This permits a smoother pressure release operation, making it possible to achieve an improved quality and consistency of moldings. Like in the pressurization step, the parallel control is carried out continuously during the period of the pressure reduction step. After the pressure reduction step has been completed, if necessary, a suitable cooling period may be provided, and the four electromagnetic servo valves 52 may be servo locked until the molding has cooled.

Referring back to the flow chart of the pressure release step shown in FIG. 6, if in Step S20, it is determined that the pressure release step has been completed, the pressure release step is terminated, and a mold release step (6) is started. In the mold release step, a process according to the flow chart shown in FIG. 7 is implemented, whereby operation of the four mold clamping hydraulic cylinder mechanisms 30 is controlled so as to carry out a pressure release operation from point H through point I shown in FIG. 8.

Figure 7:
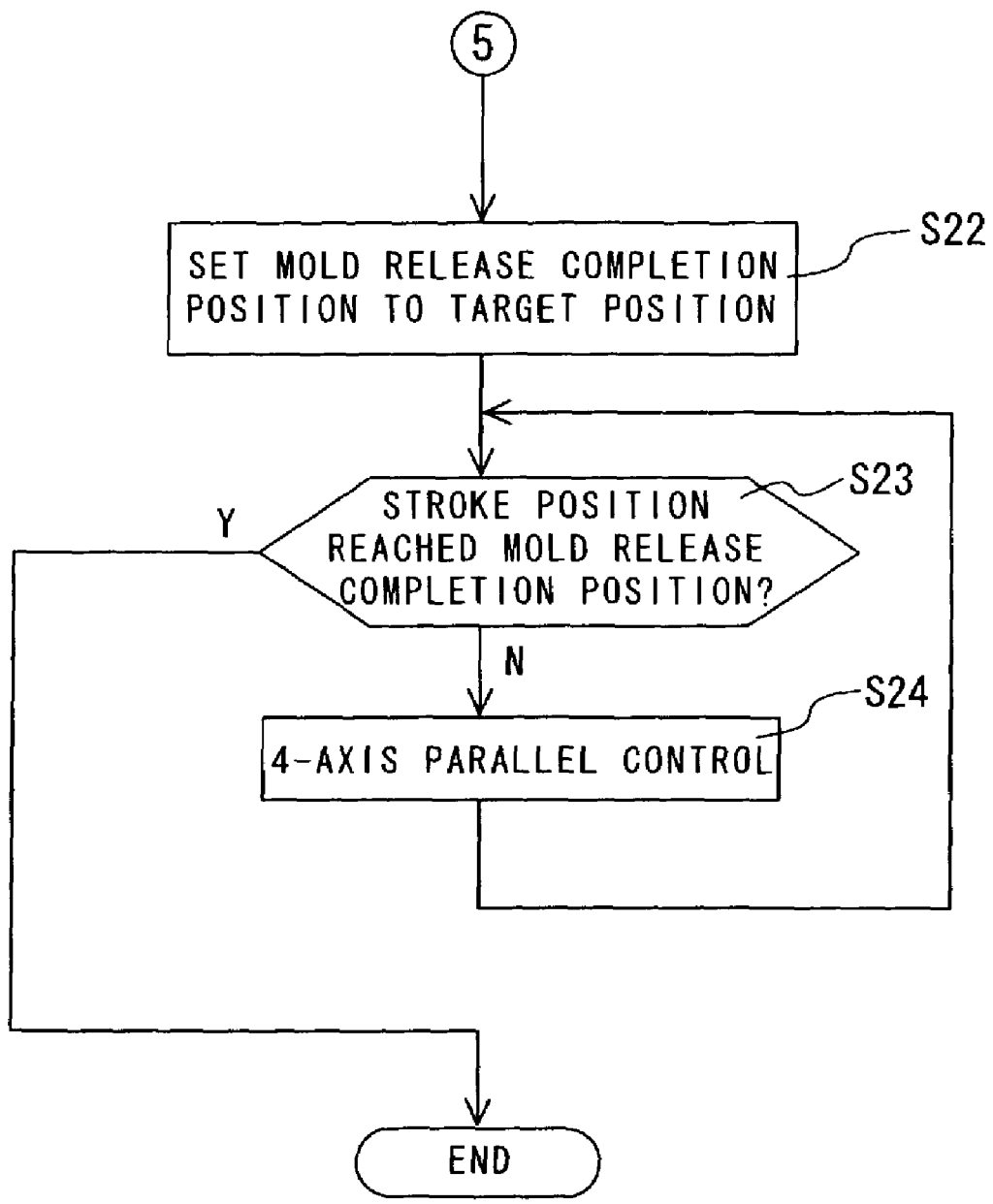
FIG. 7 is a flow chart for illustrating a mold release step successive to the pressure release step of FIG. 6.

Specifically, as shown in FIG. 7, when the mold release step is started, first in Step S22, the mold clamping force (mold clamping pressure), which was the substantial object of control employed as an indicator for the mold clamping operation in the pressurization step and the pressure release step, is switched back to stroke position, which was employed as an indicator for the mold clamping operation in the approach step and the pressing step. Specifically, operation of the mold clamping hydraulic cylinder mechanisms 30 is controlled so that the average value (average position) sensed by the linear scales 56 in the mold clamping hydraulic cylinder mechanisms 30 reaches a preset target position for the mold release operation. The value of the target position may be modified during the mold release step.

Next, in Step S23, a determination is made as to whether the average of actual sensed stroke positions (average position) has reached the target position. If the average position has not reached the target position, the control flow proceeds to Step S24, and continues the mold release operation while implementing four-axis parallel control. On the other hand, if, in step S23, it is determined that the average position has reached target position, the mold release step is terminated.

The specific control process in the mold release step can be realized, for example, with a control system similar to that in the approach step shown in FIG. 9, by modifying the target position provided by control device 60 to the position at conclusion of mold release, in order to control the four electromagnetic servo valves 52. As well known in the art, after the mold release step has been completed, the drive member is switched from the mold clamping hydraulic cylinder mechanisms 30 to the mold opening/closing device 20, and the tie bars 24 and the half nuts 34 in the mold clamping device 22 are disengaged from each other. Subsequently, the mold opening/closing device 20 performs a high speed mold parting operation, and a mold releasing operation of the molding is performed in the parted state. Then, the control flow moves continuously on to the next molding cycle.

According to the injection press molding using the mold clamping apparatus 10 described hereinabove, the parallel control to mutually align the stroke positions of the four mold clamping hydraulic cylinder mechanisms 30 is carried out substantially continuously throughout the entire injection press molding process including the six steps of (1) the approach step, (2) the standby step, (3) the pressing step, (4) the pressurization step, (5) the pressure release step, and (6) the mold release step, which are carried out by driving the movable plate 14 by means of the mold clamping mechanisms of the mold clamping device 22. This makes it possible to prevent undesirable tilt of the movable plate 14 relative to the stationary plate 12, thereby permitting consistent injection press molding. Even where the servo motors are employed in place of the mold clamping hydraulic cylinder mechanisms 30, the control per se is conducted in similar manner, by controlling the servo motors instead of servo valves 52.

During this parallel control, the control is performed using as a target the average position in the four mold clamping hydraulic cylinder mechanisms 30 calculated by four-axis average position computing portion 62, so as to eliminate deviation of sensed positions of individual mold clamping hydraulic cylinder mechanisms 30 from this average position. Thus, as compared to the case where a certain mold clamping hydraulic cylinder mechanism is used as a benchmark (master) with the other mold clamping hydraulic cylinder mechanisms following it (slaves), delay in the parallel control can be reduced, and parallel of the movable plate 14 relative to the stationary plate 12 can be maintained with extremely high precision.

During the position control and the pressure control to effect the mold clamping operation of the movable plate 14 as well, the average position and the average pressure in the four mold clamping hydraulic cylinder mechanisms 30 are used as the target position and the target pressure. Thus, as compared to the case where a position and mold clamping force (pressure) in a single certain mold clamping mechanism (mold clamping hydraulic cylinder mechanism 30) are used as target values, the mold clamping operation can be performed in a more stable manner, the target mold clamping pressure can be applied effectively to a molding, and a high degree of dimensional accuracy of the molding can be achieved.

Additionally, as the feed forward control and the PID control are performed at the same time, the characteristics of the parallel control can be adjusted largely independently of the characteristics of the position control and pressure control for the mold clamping operation of the movable plate 14. This permits that the movable plate 14 can move at predetermined speed and effectively apply a target level of mold clamping pressure to a molding, while carrying out the parallel control.

In the pressurization step wherein the mold clamping pressure is particularly high, the substantial object of control is pressure, making it possible to achieve highly precise mold clamping control, as compared to the case where position is the object of control.

While the presently preferred embodiment of this invention has been described above in detail for the illustrative purpose only, it is to be understood that the present invention is not limited to the details of the illustrated embodiments, but may be otherwise embodied with various other changes, modifications and improvements, which may occur to those skilled in the art, and it is intended that the invention cover such modifications provided they fall within the scope and spirit thereof.

In the illustrated embodiment, for example, employed is the mold clamping hydraulic cylinder mechanisms 30 of the double action cylinder construction, and a pressure of the hydraulic fluid applied to cylinder chambers pressurized in the mold clamping direction is sensed by means of the pressure sensors 58 provided in the lines, as shown in FIG. 1. However, the hydraulic fluid pressure within the cylinder chambers could instead be sensed directly, or alternatively pressure sensors for sensing fluid pressure applied to the cylinder chambers pressurized in the parting direction of the mold clamping hydraulic cylinder mechanisms 30 could be additionally provided, and the difference in readings from the two sensors employed as sensed pressure, thereby achieving more highly accurate pressure sensing, and operational control based thereon.

In the illustrated embodiment, during the steps of the injection press molding operation from initial injection of a molten resin material to completion of cooling of the molding, the mold clamping pressure is employed as the substantial control indicator in the pressurization step and pressure release step. However, the mold clamping force (mold clamping pressure) could be employed as an indicator in other steps, such as the pressing step.

As will be apparent from the description hereinabove, according to the compression molding method of the present invention, control based on a first control signal by means of mold clamping force exerted overall on a plurality of mold clamping mechanisms, and control based on a second control signal of deviation in relative stroke position among the plurality of mold clamping mechanisms can be adjusted independently of each other. Thus, tilt of the movable plate relative to the stationary plate can be held in check by means of control based on the second control signal, while making it possible to perform the desired mold clamping operation by driving the movable plate in proximity with the stationary plate by means of control based on the first control signal, so that the desired mold clamping operation may be carried out in a stable manner and with a high degree of precision.

The compression molding method of the present invention is advantageously implemented in a mold clamping apparatus having a structure according to the present invention.

It is also to be understood that the present invention may be embodied with various other changes, modifications and improvements, which may occur to those skilled in the art, without departing from the spirit and scope of the invention defined in the following claims.

What is claimed is:

1. A method of compression molding that is effected by using a mold including a stationary mold half and a movable mold half that cooperate to define therebetween a mold cavity, and by executing a mold clamping operation to clamp together said stationary mold half and said movable mold half that are parted by a predetermined amount with a molding compound such as plasticized synthetic resin material present in said mold cavity with a mold clamping force exerted across said stationary mold half and said movable mold half by means of a plurality of mold clamping mechanisms, said method comprising the steps of:

sensing said mold clamping forces in said plurality of mold clamping mechanisms to obtain sensed mold clamping forces;

calculating an average value of said sensed mold clamping forces;

obtaining a first control signal on the basis of deviation between a preset target mold clamping force for said mold clamping mechanisms and said average value of said sensed mold clamping forces;

sensing positions of movable members of said plurality of mold clamping mechanisms to obtain sensed positions of said movable members;

calculating an average value of said sensed positions of said movable members of said plurality of mold clamping mechanisms;

setting said average value of said sensed positions of said movable members as a successive target position;

obtaining a second control signal on the basis of deviation between each of said sensed positions of said movable members of said plurality of mold clamping mechanisms and said successive target position;

obtaining a clamping control signal for each of said plurality of mold clamping mechanisms by adding said first control signal and said second control signal; and executing the mold clamping operation using the clamping control signal.

2. A method of compression molding according to claim 1, further comprising the steps of: computing a first speed signal on the basis of said deviation between said preset target mold clamping force and said average value of said sensed mold clamping forces in said plurality of said mold clamping mechanisms, in order to obtain a mold clamping force/speed conversion instruction value; and obtaining a second speed signal corresponding to said first control signal by processing said mold clamping force/speed conversion instruction value with predetermined control gain; and adding said second speed signal to said second control signal in order to obtain said clamping control signal for each of said mold clamping mechanisms.

3. A method of compression molding according to claim 1, wherein during an initial stage of said mold clamping operation, said clamping control signal is obtained by sensing positions of said movable members of said mold clamping mechanisms; calculating an average value of said sensed positions of said movable members of said mold clamping mechanisms; obtaining a third control signal on the basis of deviation between a preset final target position and said average value of said sensed positions of said movable member of said mold clamping mechanisms; and adding said second control signal and said third control signal to obtain said clamping control signal for each of said mold clamping mechanisms, and if any of said sensed mold clamping forces in said plurality of mold clamping mechanisms reaches a target switchover mold clamping force that is preset within a range of 60–95% of said target mold clamping force, said first control signal instead of said third control signal is employed, and said first control signal and said second control signal are added to obtain said clamping control signal for each of said mold clamping mechanisms.

4. A method of compression molding according to claim 3, wherein at least one of a time of said mold clamping operation and said sensed positions of said movable members of said plurality of mold clamping mechanisms are monitored in said initial stage, and said first control signal is employed instead of said third control signal on a condition that a predetermined period of time of said mold clamping operation has been elapsed or any of said movable members of said plurality of mold clamping mechanisms has reached a predetermined position prior to any of said sensed mold clamping forces in said plurality of mold clamping mechanisms reaches said target switchover mold clamping force so as to obtain said clamping control signal for each of said mold clamping mechanisms by adding said first control signal and said second control signal.

5. A method of compression molding according to claim 3, wherein when calculating said third control signal in said initial stage of said mold clamping operation, said final target position is set to a position on a negative side, where a completely closed state of said stationary mold half and said movable mold half is designated as zero position and a mold parting direction is designated as a positive side.

6. A method of compression molding according to claim 1, wherein said compression molding comprises an injection press molding, and said injection press molding is executed by injecting molten resin material to fill said mold cavity defined by said stationary mold half and said movable mold half in a state of being parted by a predetermined amount, and then implementing said mold clamping operation.

7. A method of compression molding according to claim 1, wherein said mold clamping mechanisms comprise mold clamping hydraulic cylinder mechanisms operated by means of servo valves, pressures in said mold clamping hydraulic cylinder mechanisms are sensed to obtain said sensed mold clamping force in the form of sensed pressure in said plurality of mold clamping hydraulic cylinder mechanisms, said first control signal is obtained on the basis of deviation between a preset target pressure for said mold clamping hydraulic cylinder mechanisms and an average value of said sensed pressures in said mold clamping hydraulic cylinder mechanisms, stroke positions of said mold clamping hydraulic cylinder mechanisms are sensed to obtain said sensed positions of said movable members in the form of sensed stroke positions in said plurality of mold clamping hydraulic cylinder mechanisms, an average value of said sensed stroke positions are calculated, said average value of said sensed stroke positions is designated as a successive target stroke position, and said second control signal is obtained on the basis of deviation between each of said sensed stroke positions of said plurality of mold clamping hydraulic cylinder mechanisms and said successive target stroke position.

8. A method of compression molding according to claim 7, wherein said step of obtaining said clamping control signal by adding said first control signal and said second control signal, further includes the steps of: setting said first control signal to 0 and obtaining said clamping control signal on the basis of said second control signal in the event that said average value of said sensed pressures in said mold clamping hydraulic cylinder mechanisms or said sensed pressure in any of said plurality of mold clamping hydraulic cylinder mechanisms lies in a preset blind area.

9. A method of compression molding according to claim 7, further comprising the steps of: sensing pressure in said plurality of mold clamping hydraulic cylinder mechanisms in the event of a pressure release to reduce pressure in said plurality of mold clamping hydraulic cylinder mechanisms after completing said mold clamping operation; calculating an average value of said pressure obtained; calculating a fourth control signal on the basis of deviation between a preset target value for pressure release and said average value of said pressure obtained; and obtaining said clamping control signal by adding said second control signal and said fourth control signal.

* * * * *

UNITED STATES PATENT AND TRADEMARK OFFICE
CERTIFICATE OF CORRECTION

PATENT NO. : 7,001,545 B2
DATED : February 21, 2006
INVENTOR(S) : Shoij Okado and Yasuhiro Yabuki It is certified that error appears in the above-identified patent and that said Letters Patent is hereby corrected as shown below:

<u>Title page,</u>
Item [56], References Cited, should add:
-- FOREIGN PATENT DOCUMENTS

JP    5-269749  A    10/19/1993
JP    11-117944 A    04/27/1999 --.

Signed and Sealed this

Ninth Day of May, 2006

JON W. DUDAS
*Director of the United States Patent and Trademark Office*